Sept. 9, 1947. C. A. RILEY 2,427,229
METHOD OF JOINING A SHEETLIKE MATERIAL TO OTHER
MATERIALS, AND THE PRODUCT SO PRODUCED
Filed May 25, 1943
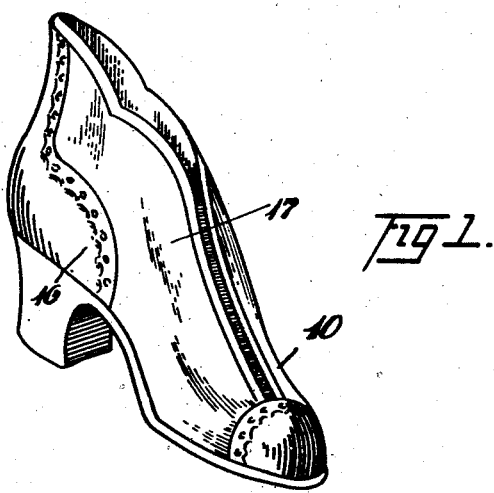
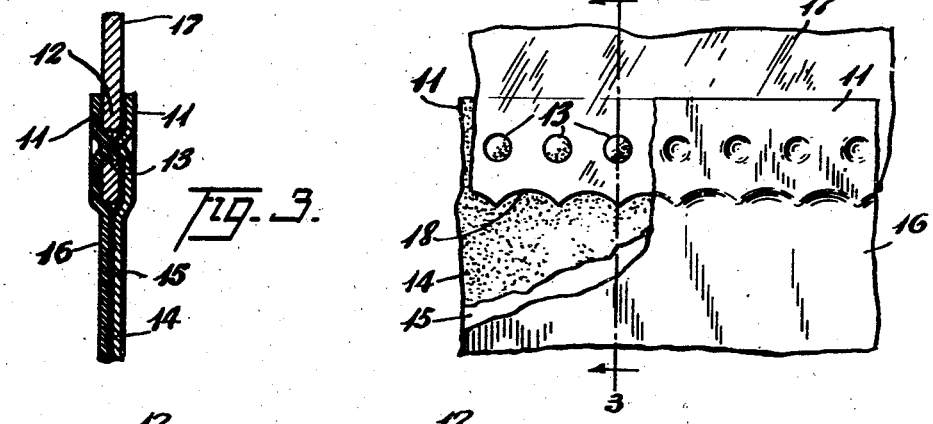
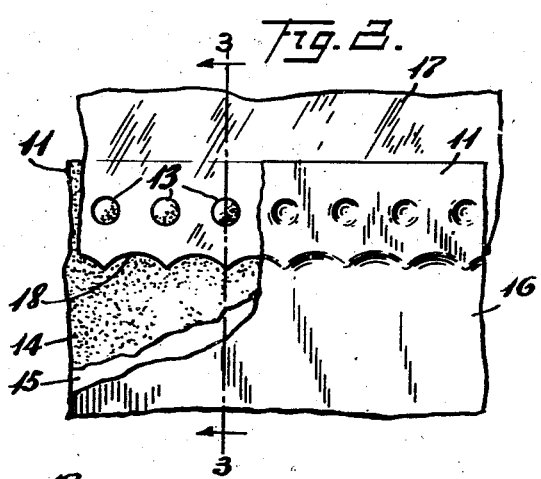
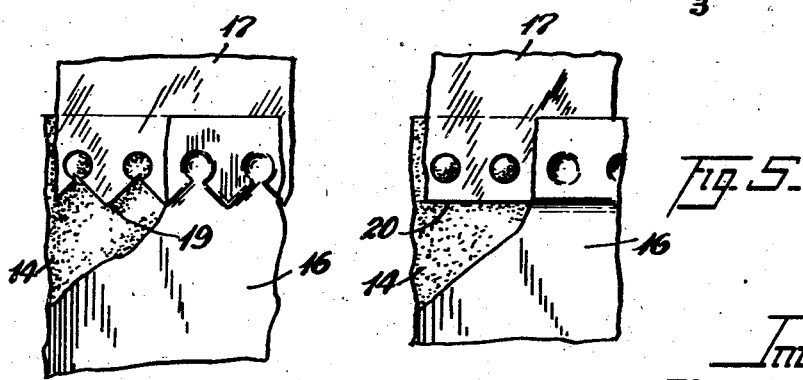
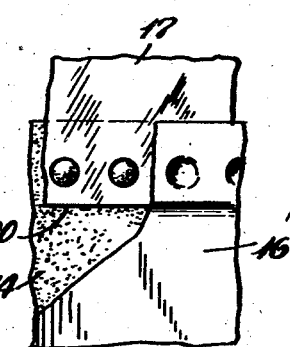
Inventor
Chester A. Riley Patented Sept. 9, 1947

2,427,229

UNITED STATES PATENT OFFICE 2,427,229

METHOD OF JOINING A SHEETLIKE MATERIAL TO OTHER MATERIALS, AND THE PRODUCT SO PRODUCED

Chester A. Riley, Melrose, Mass., assignor to The B. F. Goodrich Company, New York, N. Y., a corporation of New York Application May 25, 1943, Serial No. 488,356

10 Claims. (Cl. 154—42)

1

This invention relates to a method of joining a sheet-like material to other materials, and relates particularly to the method of adhering two sheets of materials at their marginal areas to produce a continuous sheet-like structure. The invention likewise relates to the products of the method.

In making many articles of manufacture it is often necessary that two dissimilar materials be joined together at their edges to form one continuous sheet or sheet-like element. This is particularly true in shoe manufacture where shoes that are made principally of rubber and the like may have inserts of synthetic plastics or the like for decorative and other purposes. It has been found that with these materials it is often impracticable to sew them together as the stitches tear out when the articles are in service. Merely cementing the sheets of material together at their marginal areas to make lap joints also proves unsatisfactory as the joints are weak and easily pull apart.

I have found a method of joining two materials together, such as a sheet of rubber and a sheet of plastic, whereby these disadvantages may be eliminated and a continuous sheet-like structure produced that has a strong, long-lasting joint. The invention may be used for joining many materials but is particularly adapted for use in joining marginal areas of a sheet of rubber and a sheet of a synthetic plastic as heretofore the joining of these materials had been most difficult to accomplish.

This invention will be described in conjunction with the accompanying drawings which show one embodiment of the invention wherein a sheet of a transparent plastic is joined to a composite sheet of rubber and fabric for use in the manufacture of shoes. Of the drawings Fig. 1 is a perspective view of a rubber and fabric shoe such as a woman's dress overshoe having side portions of a colored transparent plastic material;

Fig. 2 is an elevation partially broken away, showing a composite sheet of rubber and fabric and a sheet of plastic joined together by the method of this invention;

Fig. 3 is a section taken along line 3—3 of Fig. 2;

Figs. 4 and 5 are views similar to Fig. 2 showing two modifications of the invention.

In building a shoe 10 (Fig. 1) having portions of rubber or rubber-coated fabric and portions of a synthetic plastic it is, of course, necessary that the rubber and plastic portions be joined at

2 their margins. By the method of this invention this joining is simple and produces a strong bond that will last for the entire life of the shoe. By the method of this invention a marginal area of the rubber sheet is provided in two sections 11, 11 that ordinarily would lie in superposed relationship with each other. A corresponding marginal area 12 of the sheet of plastic material 17 is provided with a plurality of cut-out perforations 13, 13 preferably lying in a substantially straight line substantially parallel to the edge of the plastic sheet along which the aforesaid marginal area is located. The two sections 11, 11 of the rubber sheet are then arranged in overlapping relationship on either side of the perforated marginal area 12 of the plastic sheet to cover the cut-out perforations, and the two sections are adhered to the plastic sheet and to each other. This adhering to each other includes adhering the two sections to each other through the cut-out perforations.

Rubber shoes usually have a fabric lining in order to provide greater strength and comfort in the shoe. For this reason the specific embodiment of the invention will be described in conjunction with the preparation of material for building a shoe of this type.

In manufacturing a rubber shoe having plastic inserts, such as transparent upper portions, the plastic sheet is perforated along the margin 12 to be joined to provide a plurality of cut-out perforations 13, 13 extending substantially parallel to the edge of the plastic sheet. This edge is preferably cut to provide a serrated edge. It may be scalloped, as shown at 18 in Fig. 2, or the serrations may consist of points having straight sides extending into the cut-out perforations, as shown at 19 in Fig. 4. These serrations are not absolutely necessary, however, as the edge may be left straight, as shown at 20 in Fig. 5. A sheet of fabric 14 is coated on one side with unvulcanized rubber 15 and a sheet of unvulcanized rubber 16 corresponding in size to the rubberized fabric is provided. This rubber 16 is pressed into contact with the rubber side of the coated fabric except for a marginal area which is left open and spread apart. The perforated marginal area 12 of the plastic sheet 17 is coated with a rubber cement and this area is inserted between the rubber 15 on the rubberized fabric and the sheet of rubber 16 where it was left open in the previous operation. The rubber and the rubberized fabric are then pressed into intimate contact with the cemented plastic and with each other wherein contact and the rubber is vulcanized. This produces a strong bond that is as strong, for all practical purposes, as any other portion of the composite sheet of material.

The method of this invention produces a continuous sheet like structure comprising a sheet of plastic and a sheet of rubber, or rubberized fabric, joined together at marginal areas of each. The strength of the bond is due to the fact that the rubber is not only adhered to the plastic but the rubber is also adhered to itself through the cut-out perforations in the plastic sheet. In effect, therefore, the plastic and the rubber are joined not only by adhesion but also by a mechanical inerlocking which is very much like that provided by links in a chain.

The adhesive used for joining the marginal areas of the rubber to the marginal area of the plastic, and the rubber to itself through the cut-out perforations, may be any suitable adhesive but is preferably a flowable rubber adhesive of a high rubber content. This flowable rubber adhesive may be either solvent or aqueous dispersed natural rubber, reclaimed rubber or synthetic rubber, suitably compounded with the ordinary compounding materials. It may be applied to the plastic sheet, to the rubber sheet, or both, and may be used not only to join the rubber to the plastic but may also be used to join the two superposed sections of rubber to each other. The rubber sheet is preferably unvulcanized before joining the plastic sheet but may, if desired, be in a vulcanized condition. In this latter case the cement used should be one that vulcanizes at ordinary room temperatures. All these different cements and their uses are well understood by those skilled in the rubber art.

The synthetic plastic sheet which is joined to the rubber sheet in the above-described embodiment of this invention may be any of the large number of plastic materials that are today widely used in industry. It may be either thermoplastic or thermosetting and includes such well-known materials as flexible plastics of casein, cellulose derivatives such as the nitrate or acetate, acrylate resins, rubber derivatives, polystyrene, vinyl polymers, and the like. There are a great number of these materials and their uses and characteristics are well-known in the art. Transparent sheet materials such as the transparent varieties of "Koroseal" and similar commercial materials are especially desirable. The rubber sheet may be natural rubber, reclaimed rubber, or any of the ordinary synthetic rubbers.

Although the method of this invention eliminates the necessity for thread stitching, or the like, and produces a much stronger bond than stitching alone is capable of producing, yet, if desired, stitching may be used in addition to the adhered bond. This gives still greater strength and, for certain articles, is often desirable.

This invention has been described in great detail as applied to the production of materials useful in making rubber shoes having plastic inserts. It is to be understood, however, that the invention is not to be limited to this embodiment or to any of the mere details of the manufacture but is, rather, to be protected broadly within the spirit and scope of the invention as set out in the appended claims.

I claim:

1. In an article of footwear, an upper including a sheet-like element comprising synthetic plastic material apertured in a marginal zone thereof, a second sheet-like element comprising vulcanized rubber material disposed with a marginal zone only thereof overlapping one face of the apertured zone of the synthetic plastic element and with another portion thereof extending well beyond the overlap, and a third element marginally overlapping the other face of the apertured zone of the synthetic plastic element and also being securely associated with portions of the second element extending well beyond the overlap to form a unitary sheet-like element constituting a principal part of the upper, the second and third said elements being united through the apertures in the synthetic plastic element, adhesive union of said elements constituting the sole means securing said elements together in the zone of overlap.

2. In an article of footwear, an upper including a sheet-like element of synthetic plastic material apertured in a marginal zone thereof, a second element comprising plural-ply material including a ply of rubber and a ply of rubberized fabric disposed with its rubberized face in opposition to a face of said ply of rubber, the apertured marginal zone only of the synthetic plastic element being disposed between marginal zones only of the two plies of the plural-ply sheet and said two plies being united through the apertures in the synthetic plastic sheet, said article being devoid of stitching passing through said elements in the zone of overlap.

3. The method of making an article of footwear or other curvedly shaped article having sheet rubber material united at a margin thereof with sheet non-rubber material, which method comprises providing apertures in a marginal zone of the sheet non-rubber material, arranging the apertured marginal zone of the non-rubber material in overlapping relation with a marginal zone only of the sheet rubber material, and uniting the rubber material through the apertures in the non-rubber material with a third sheet of material which is also united in direct face-to-face relation with the rubber material to form a unitary composite sheet extending well beyond the marginal zone of overlap, the said rubber material being in an unvulcanized condition at the time said uniting is effected and thereafter being subjected to vulcanization.

4. The method of making an article of footwear or other shaped article having sheet rubber material united at a margin thereof with sheet non-rubber material, which method comprises providing apertures in a marginal zone of the sheet non-rubber material, arranging the apertured marginal zone of the sheet non-rubber material in overlapping relation with a marginal zone only of a sheet of unvulcanized rubber material, uniting the unvulcanized rubber material through the apertures in the non-rubber material with a third sheet of material having a face of unvulcanized rubber material and which is also united with the sheet of rubber material in a zone outside the marginal zone of overlap, and thereafter vulcanizing the unvulcanized rubber.

5. The method which comprises providing a composite sheet having a ply of rubber and a ply of backing material united together in face-to-face relation to provide a unitary sheet of substantial extent but having the two plies separated in a relatively narrow marginal zone, providing apertures in a marginal zone of a sheet of non-rubber material which is poorly adherent to rubber, inserting the apertured marginal zone only of the non-rubber material between the marginally separated plies of the composite sheet, and uniting the said plies through the apertures in the non-rubber material.

6. The method which comprises uniting plies of rubber and rubberized fabric in direct face-to-face relation to provide a unitary composite sheet member of substantial extent while leaving the said plies separated in a relatively narrow marginal zone, the rubber in both plies being unvulcanized, providing apertures along a marginal zone of a sheet of synthetic plastic material which is poorly adherent to rubber, inserting the apertured marginal zone only of the synthetic plastic sheet between the marginally separated plies of the said composite sheet, uniting the said plies through the apertures in the synthetic plastic sheet, and thereafter vulcanizing the rubber in the assembly.

7. The method of making an article of footwear having a fabric lined rubber upper provided with an insert of synthetic plastic or other non-rubber sheet material marginally united to the fabric lined rubber upper, said method comprising the steps of providing apertures in a marginal zone of the insert, arranging the apertured marginal zone of the insert between marginal zones only of two constituent plies of the fabric lined rubber upper material, the faces of said plies contiguous said insert each comprising unvulcanized rubber, uniting said unvulcanized rubber faces through said apertures in the insert, and thereafter vulcanizing the article.

8. An article of footwear or the like having an upper comprising vulcanized rubber material and a side panel insert of non-rubber material united to the rubber material solely along margins of the two materials, the margin of the panel insert being serrated and having apertures therein, the rubber material being united through said apertures to a backing sheet and also being pressed into the marginal serrations to provide a decorative effect along the margin.

9. A curvedly shaped article of manufacture such as an article of footwear having a non-planar wall section, said non-planar wall section including a section of sheet vulcanized rubber material and a section of sheet non-rubber material united to the rubber material in overlapping relation solely along margins of the two materials, the non-rubber material having apertures along a margin thereof and the rubber material being united through said apertures with a backing sheet which is also united with the rubber material in a zone outside the marginal zone of overlap, the means uniting said rubber material and said backing sheet in the zone of overlap being solely adhesive bonding means devoid of stitching.

10. An article of manufacture such as an article of footwear or the like having a wall portion of substantial extent comprising fabric lined rubber material including a ply of rubber and a ply of rubberized fabric arranged with its rubberized face in adhesive relation with the rubber ply, the rubber ply and the fabric ply being substantially coextensive, and another wall portion of substantial extent comprising sheet synthetic plastic material united to the fabric lined rubber material solely along marginal zones of the two materials, a margin of the sheet synthetic plastic material having a series of apertures therein and the apertured marginal zone being inserted between marginal zones only of the aforesaid rubber ply and rubberized fabric ply, the last said two plies being united through the apertures in the sheet synthetic plastic material to form a mechanical interlock therewith, the means uniting said last two plies through the said apertures being an adhesive bond devoid of stitching.

CHESTER A. RILEY.

REFERENCES CITED

The following references are of record in the file of this patent:

UNITED STATES PATENTS

| Number | Name | Date |
| --- | --- | --- |
| 1,590,047 | Martin | June 22, 1926 |
| 2,306,306 | Ferrettie | Dec. 22, 1942 |
| 1,730,929 | Flynn | Oct. 8, 1929 |
| 1,977,108 | Arnberg | Oct. 16, 1934 |
| 1,545,328 | Holland | July 7, 1925 |
| 2,347,191 | McGillicuddy | Apr. 25, 1944 |